Patented June 28, 1932

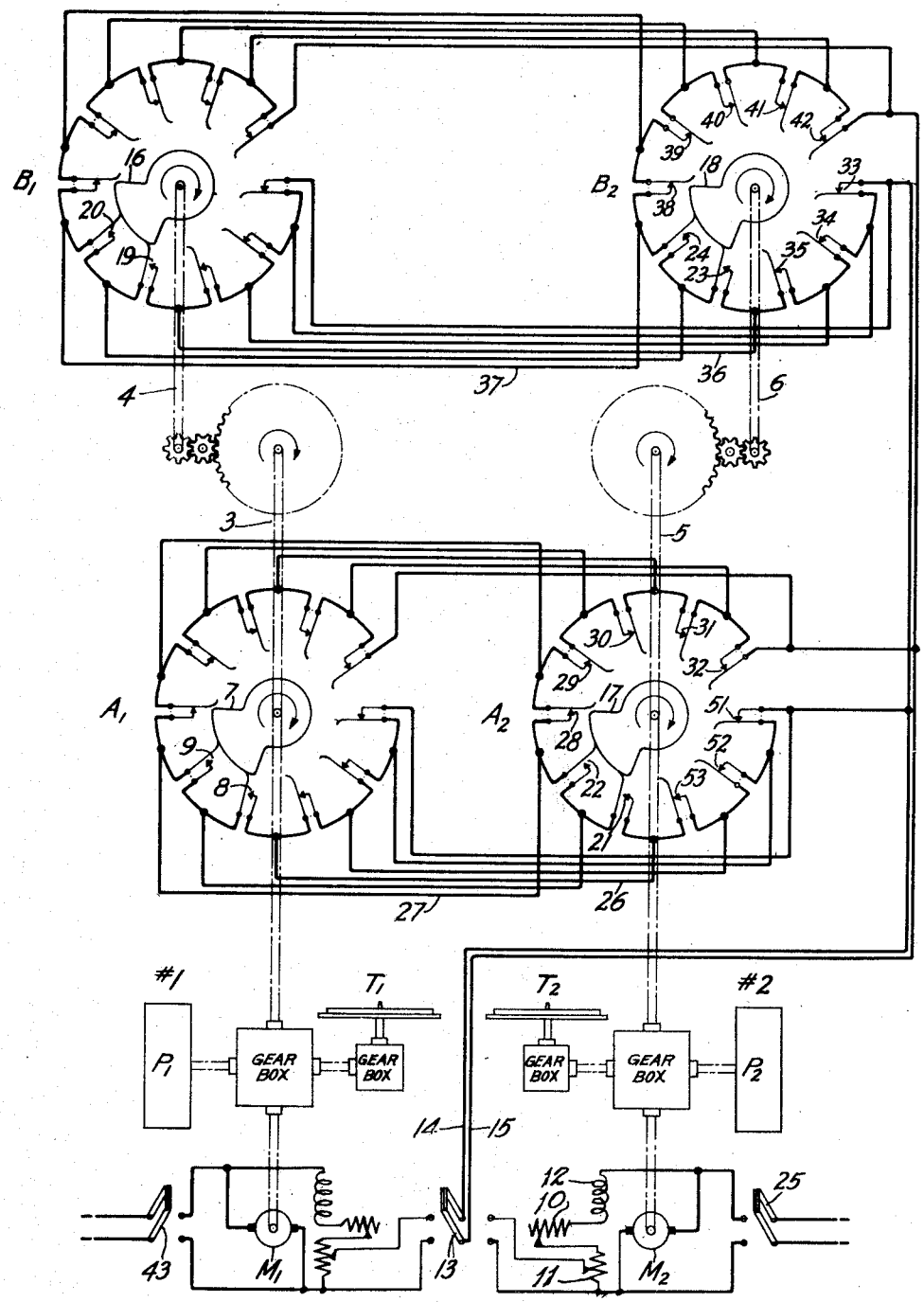

1,865,136

UNITED STATES PATENT OFFICE

LOUIS M. POTTS, OF EVANSTON, ILLINOIS, ASSIGNOR TO BELL TELEPHONE LABORATORIES, INCORPORATED, OF NEW YORK, N. Y., A CORPORATION OF NEW YORK

SYNCHRONIZING SYSTEM

Application filed April 10, 1929. Serial No. 353,992.

This invention relates to synchronizing systems and more particularly to those such as talking moving picture systems wherein two or more machines or combinations of machines are required to operate alternately each one in turn being started from rest and brought into synchronism with the other to continue the performance and permit the other machine to be stopped temporarily for changing records or for other reasons.

Such systems involving mechanical connections between the machines are not new in the art. For instance, Patent No. 1,268,472 granted to O. E. Kellum June 4, 1918 discloses an arrangement having a special starting motor controlled by contacts operating through perforations in a control film for bringing an idle machine up to speed and into correct phase position with another machine which has very nearly completed the reproduction of its record. There are also various schemes for operating devices of this sort in synchronism or for bringing one device into synchronism with another which depend for their operation on cable connections rather than mechanical connections between the devices. Systems of this kind are shown in British Patents 165,489 and 240,404.

It is the object of this invention to provide an improved synchronizing system of this latter type which is capable of bringing the machines into proper synchronous relation and maintaining that relation within very close limits.

In accordance with the general features of the invention, a plurality of sets of contacts on each machine adapted to control a speed correction system are arranged in parallel and operated at predetermined speed ratios thereby obtaining a degree of regulation obtainable heretofore only by a much larger number of contacts. By way of a more specific description, the speed of the incoming machine is varied by means of a control circuit which includes the sets of contacts on each of the machines. Corresponding contacts are cross connected between the machines and all of the contacts of each set are in series in the control circuit. The contacts of each set operate in a predetermined regular sequence and are so adjusted that the control circuit is open only when the machines are in synchronism, in which case no further correction occurs. Since the sets of contacts are in parallel and one set is operating at several times the speed of the other, it is evident that during each interval of operation of the slow operating set of contacts a number of operations of the fast operating contacts will occur so that with only a very slight deviation from exact synchronism one of the two branches of the control circuit will be closed to provide a circuit for operating the correcting mechanism.

A clearer understanding of the invention may be obtained from a study of the following detailed specification in connection with the accompanying drawing showing one embodiment of the invention. For the purpose of illustration, the drawing shows two complete talking moving picture machines adapted for continuous performance but since the present invention is concerned principally with a synchronizing arrangement, only a schematic disclosure is made of the projection machines $P_1$ and $P_2$, the turntables $T_1$ and $T_2$, the driving motors $M_1$ and $M_2$, etc., which form no part of the invention.

According to the drawing, each machine is driven by an electric motor having the necessary speed controlling circuits and synchronism between the projection machine and its corresponding phonograph turntable is maintained by means of a rigid mechanical connection. In practice it has been found preferable that the synchronizing contacts be operated by means of cams mounted on the various shafts. However, for the sake of simplifying the disclosure and making it more easily understood, these contacts have been shown in the drawing as being operated by a single rotating cam in each case. As pointed out above, there are two sets of contacts such as $A_1$ and $B_1$ associated with each machine and operated at different speeds in accordance with the gear ratio employed between the shafts 3 and 4 and 5 and 6 respectively. By proper choice of this gear ratio, it is possible of course, to obtain any degree of sensitivity desired in the correcting system, within the limits of its practical operation. In the system disclosed there are ten contacts in each set, arranged 36° apart and each cam such as 7 is arranged to hold two adjacent contacts such as 8 and 9 open at once. It will be seen therefore, that for each 36° of rotation, one set of contacts closes and another opens.

The operation of this synchronizing system will now be described. Assume machine No. 1 to be in operation and to have nearly completed its record. At the proper moment the power supply switch 25 to the motor $M_2$ is closed, thereby starting machine No. 2.

The resistances 10 and 11 associated with the field winding 12 of the motor $M_2$ are such that the motor, when the switch 13 is open, will accelerate to a speed slightly in excess of the normal speed for proper operation. A suitable signal device (not shown) may be used to indicate when the machine has reached the predetermined excess speed and the switch 13 is then closed to its right-hand position, thereby effectively shunting out resistance 11, since the circuit between wires 14 and 15 will be closed substantially all the time while the machine No. 2 is operating above synchronous speed. This fact may be more clearly understood by considering the relative positions of the rotating cams 7, 16, 17 and 18 at any given instant. If the machines are operating in synchronism in the proper relative phase position, these cams at some instant will occupy the positions in which they are shown in the drawing. Contacts 8, 9, and 19 to 24 will then be open so that no circuit can be traced between the conductors 14 and 15. When machine No. 2 is ahead of machine No. 1, however, such as when contacts 21 and 22 of machine No. 2 are open, but contact 8 of machine No. 1 corresponding to contact 21 of machine No. 2 has not yet been opened by cam 7, the shunt correcting circuit may be traced from the switch 13, conductor 14, contacts 51, 52 and 53, conductor 26, contacts 8 and 9, conductor 27, contacts 28 to 32, to conductor 15, thereby short-circuiting the resistance 11 and causing the motor $M_2$ to slow down and approach its proper synchronous position.

If the gear ratio between the A and B sets of contacts is 10, obviously any lead in the operation of cam 17 over cam 7 is multiplied ten-fold in the lead of cam 18 over cam 16 so that when this displacement between the machines is only $\frac{1}{10}$ as great as in the case just described, a circuit between conductors 14 and 15 may be traced through contacts 33, 34 and 35, conductor 36, contacts 19 and 20, conductor 37, contacts 38 to 42 to the conductor 15 thereby causing an increase in the field current and the consequent slowing down of the motor $M_2$ as before.

From the foregoing description it will be evident that the speed of machine No. 2 will continue to decrease as long as there is any difference in speed or phase between the machines. When the synchronous position has been reached, machine No. 1 may be stopped and removed from service, and machine No. 2 may be employed to continue the performance without interruption.

It will be understood of course, that this correcting system is reversible, that is to say, that when machine No. 2 is in operation it will act in a similar manner to bring machine No. 1 up to speed and in synchronism with No. 2. In order to accomplish this, it is only necessary to throw the switch 13 to its left-hand position and to energize driving motor $M_1$ by closing the power supply switch 43.

To avoid unnecessary complications in this specification, this invention has been described with reference to a simple manual system rather than one which is almost entirely automatic. For instance, the energizing of the motor on the incoming machine may be accomplished automatically through the medium of a relay energized by means of a counting device associated with the turntable of the machine which has nearly completed its record. Systems of this sort are well known in the art and are described in various patents such as U. S. Patent 1,418,180 to Stunz et al. May 30, 1922. It would also be possible of course, to transfer the correcting system automatically from one machine to another by means of a relay energized when the incoming motor reaches the predetermined speed. In practice also it may well be desirable to have two sets of speed control, that is to say, to bring the incoming machine quickly up to approximately a synchronous speed and then correct the remaining difference very slowly in order that the system may be very sensitive to small deviations from exact synchronism. Schemes of this sort are commonly used in various arts such as multiplex telegraphy.

The present invention, however, is not concerned with any of these features which are all old in the art. It has been described with reference to an elementary talking moving picture system, but it is obvious that it may be applied to other systems of various kinds requiring synchronous operation. It is intended therefore, to limit the invention only by the scope of the following claims.

What is claimed is:

1. In a synchronizing system, the combination with a plurality of machines to be operated in predetermined relation to each other of a plurality of series of contacts operating at different speeds associated with each machine, cross-connections between the corresponding contacts and means responsive to the operation of the contacts for varying the speed of one of the machines.

2. In a synchronizing system, the combination with a plurality of machines to be operated in predetermined relation to each other, and a plurality of series of contacts operating at different speeds associated with each machine, of means for varying the speed of one of the machines, cross-connections between the corresponding contacts of the machines and other connections between the contacts and the speed varying means.

3. In a synchronizing system, the combination with a plurality of machines to be operated in sequence and in predetermined relation to each other, and means for varying the speed of one of the machines, of two series of contacts on each of the machines operating in predetermined sequence and at different speeds, and cross-connections between individual contacts of the corresponding series on the machines associated with the speed varying means.

4. In a synchronizing system, a machine operating at constant predetermined speed, a second machine, and means for causing it to operate at a different speed, and parallel circuits between the machines for varying the speed of the second machine, one of the circuits including a set of contacts associated with each machine and means for operating them in predetermined sequence at a speed proportional to the speed of the machine, and another of the circuits including a similar set of contacts associated with each machine but operating at a multiple of the speed of the corresponding set of contacts in the first circuit.

5. In a synchronizing system, a machine and a motor therefor operating at a constant predetermined speed, a second machine and a motor therefor normally tending to run at a speed in excess of the predetermined speed, a plurality of series of contacts on each machine operating successively and at different speeds and circuits interconnecting the corresponding contacts of the machines and controlling the speed of the second machine.

In witness whereof, I hereunto subscribe my name this 5th day of April, 1929.

LOUIS M. POTTS.